Feb. 27, 1951   C. E. JIROVSKY   2,543,173
REMOTE CONTROL FOR DUMP RAKES
Filed April 8, 1949
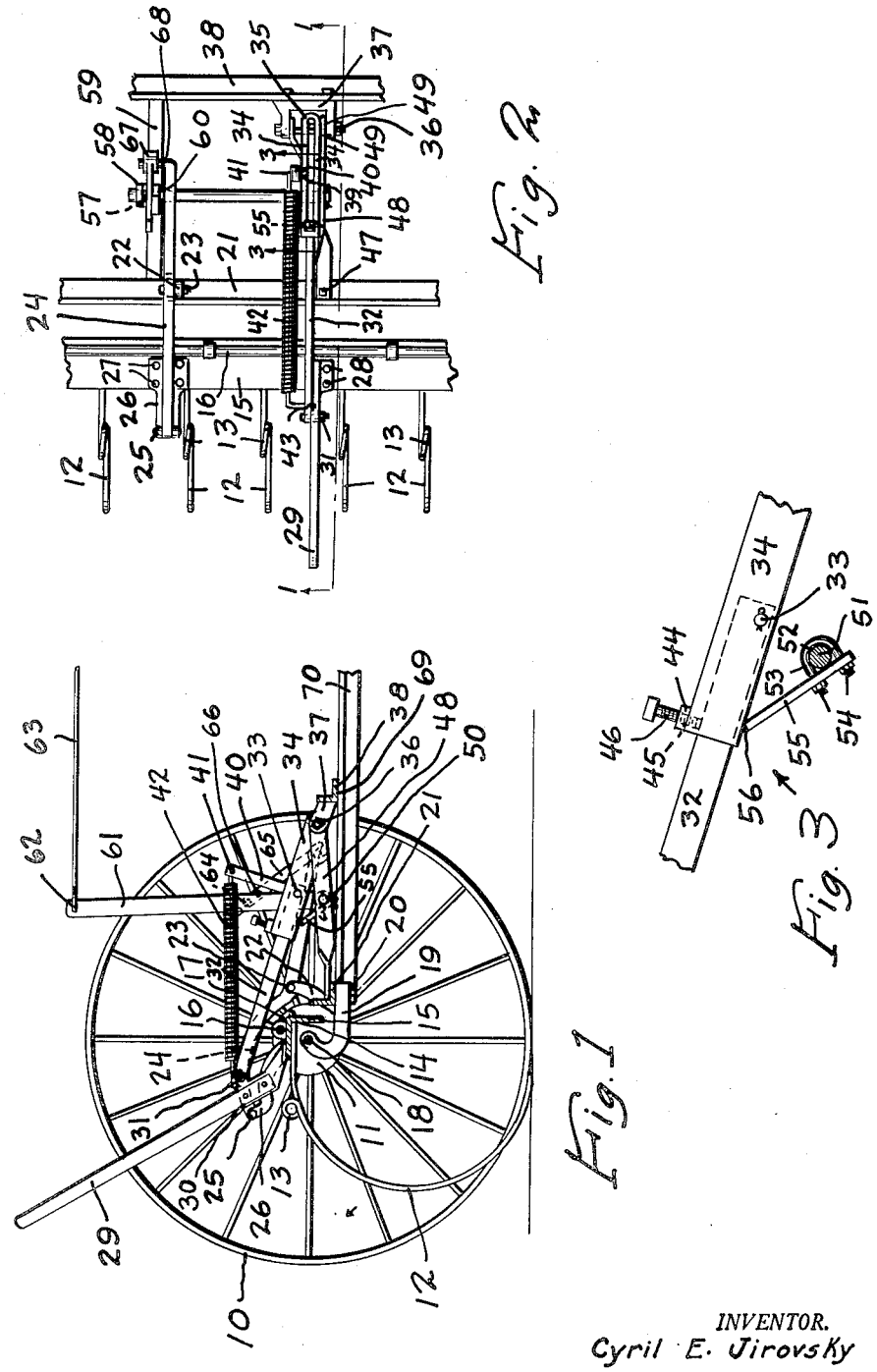
INVENTOR.
Cyril E. Jirovsky
BY
Sam J. Slotsky
ATTORNEY Patented Feb. 27, 1951

2,543,173

UNITED STATES PATENT OFFICE 2,543,173

REMOTE CONTROL FOR DUMP RAKES

Cyril E. Jirovsky, Blencoe, Iowa

Application April 8, 1949, Serial No. 86,261

3 Claims. (Cl. 56—386)

My invention pertains to a remote control for dump rakes.

An object of my invention is to provide a remote control for dump rakes wherein the control mechanism can be operated from the tractor or other vehicle drawing the rake.

A further object of my invention is to provide a control arrangement wherein the control can be effected by means of one operator only, and without requiring control by any operator on the rake itself.

A further object of my invention is to provide an arrangement of the above characteristics wherein certain elements are so arranged, so that a positive locking action is provided when the rakes are in raking position, and wherein this locking action can be broken through a tripping effect to cause the rake tines to elevate in the usual manner.

A further object of my invention is to provide certain adjustable arrangements wherein the control can be used to cause tripping of the rake to elevate the same when the rake is traveling against rocky ground or the like.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a side elevation of the arrangement as applied to a dump rake and as taken along the lines 1—1 of Figure 2, Figure 2 is a plan view of a portion of Figure 1, and Figure 3 is a detail section taken along the lines 3—3 of Figure 2.

My invention contemplates the provision of a certain tripping arrangement for attachment to a dump rake wherein the pull by an operator situated on a forward drawing tractor, will trip the rake mechanism so that it will rise automatically in the usual manner to provide a windrow.

I have used the character 10 to designate one of the side wheels of a dump rake having the hub portion 11, the hub portion including the usual standard gearing arrangement such as is described in the patent to Rutter No. 2,380,190 issued July 10, 1945, for raising the various rake tines 12 having the spring loops 13, and which tines are attached at 14 to the transverse angle member 15. Mounted on the angle member 15 is the shaft 16 which is securely attached thereto, which shaft includes further small gears and certain arrangements thereon for engaging the gears within the hub portion 11 when the member 15 is rocked, this construction being well-known in the art and not requiring explanation herein, the hub portions 11 including the further extending housings 17 which enclose a portion of the above described mechanism. Extending between the hubs is a transverse shaft 18 which is journalled within the hangers 19 which are secured at 20 to the forward framework angle 21. Attached to the member 21 is a bracket 22 to which is pivoted at 23 the actuating bar 24 which is pivoted at 25 to the bracket 26 which is attached at 27 to the swinging member 15.

Attached at 28 to the member 15 is the usual control lever 29, the lever 29 being secured within the further bracket 30. Pivotally attached at 31 to the lever 29 is the downwardly inclined strap or rod 32 which is pivoted at 33 between a pair of further straps 34, which straps terminate in the closed end 35, the straps being pivoted at 36 within the keeper 37 which is bolted to the further forward angle framework portion 38.

Attached at 39 to one of the straps 34 is the upwardly extending bar 40 to which is attached at 41 the helical spring 42 which is attached at 43 to the further end of the strap 32 and adjacently to the pivoting point 31.

Attached between the links 34 is a small boss 44 in which is threadably received at 45 the threaded bolt 46.

Attached at 47 to the angle member 21 is a twisted strap 48 which is attached at 49 to the member 37, and journalled at 50 within the strap 48 is the transverse shaft 51 to which is attached at 52 by means of the U-bolt 53 and nuts 54, the tripping bar 55 which normally abuts at 56 against the members 34 and 37 (see Figure 3).

The shaft 51 is journalled at 57 within an extending ear 58 which is attached to the strap 59 which is attached to the members 21 and 38, and securely welded to the shaft 51 at 60 is the substantially vertical control lever 61 to which is attached at 62 the pull cable 63 which passes forwardly to the tractor or other drawing vehicle. Secured at 64 to the lever 61 is a link 65 having the opening 66, the link 65 terminating in the U-shaped portion 67 which receives the inwardly bent portion 68 which is the termination of the bar 24.

Attached at 69 to the angle members 21 and 38 are the members 70 which are attached to the tractor, and which draw the rake.

The arrangement operates in the following manner. The actuating bar 24 is a standard part of the usual rake of this type, as well as the terminating portion 68, the balance of the mechanism however forming the structure of my invention.

As shown in Figures 1 and 2, the arrangement is in locked position and with the tines 12 gathering the hay as the unit is drawn forwardly. This locking effect is caused principally by the alignment of the member 32 with the straps 34, with the spring 42 maintaining the arrangement under tension. To trip the rake, the cable 63 is pulled forwardly which correspondingly rotates the shaft 51, and at the same time the engagement of the member 67 with the portion 68 will swing the bar 24 about its pivoting point 25 to start the action of pivoting the member 15 which carries the rake tines. At the same time, the tripping bar 55 is forced in the direction of the arrow in Figure 3, upwardly, where the end of the same forces against the member 34 and thence the member 32, the continued rotation of the bar 55 causing the members 32 and 34 to then pivot at 33 with respect to each other whereby the straight alignment between the members 32 and 34 will be broken, and these members will tend to fold. This action causes the bar 32 to release the lever 29 as well as to release the rotational effect of the swinging member 15, so that the above described shaft 16 will engage the gears in the hub, which gears will cause tines 12 to be raised away from the ground, due to the interengagement of the gears caused by rotation of the wheels 10. After the wheels travel a further distance, the tines 12 will descend toward the ground ready for the raking position again, the windrow thus being formed by the tripping action above described, it being understood that when the tines travel back to the position shown in Figure 1, the arrangement is again in alignment under tension as shown.

The screw 46 can be turned downwardly a fairly substantial distance if such is desired so that the lower end of the machine screw will abut against the top of the strap 32 at a point whereby the strap 32 will not be in alignment with the straps 34 but will form a slight angle therewith. By virtue of this arrangement when the tines 12 travel along rocky ground, and when the tines 12 strike a rock or similar obstacle, the angularity between these members will cause these members to pivot more quickly thereby instantly releasing the tines when such obstacles are encountered to prevent injury to the same.

The spaced openings 66 in the member 65 permit attachment at 64 to any one of the selected openings to vary the angularity of the lever 61. The reason for this structure is to provide means whereby the cable 63 will be as close to a right angle as possible with respect to the lever 61 depending upon the height of the vehicle and the position of the operator, the attachment at any one of the selected openings 66 changing the angularity to correspond thereto.

It will now be seen that I have provided the various advantages set forth in the objects of my invention with various other advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. In combination with a dump rake having an actuating bar for elevating the rake to raised position, means for remotely controlling said actuating bar including a lever, a shaft attached to and rotated by said lever, a tripping mechanism including a pair of complementary pivoted members, a forcing bar attached to said shaft for causing pivoting action between said complementary members, one of said complementary members being attached to the raising lever of said rake, said complementary members being normally in direct alignment whereby the ground engaging tines will be locked in operating position, rotation of said forcing bar by said shaft causing said complementary members to be forced out of direct alignment whereby said rake tines will be released to raised position, one of said complementary members including a pair of links receiving said other member, a tension spring attached between one of said pair of links, and the termination of said other member, a boss attached to said pair of links, a screw threadably engaged within said boss adapted to bear against the further complementary member, and whereby said screw can be turned downwardly to provide normal out of alignment position between said complementary members to provide release of said tines when striking against obstacles.

2. In combination with a dump rake having an actuating bar for elevating the rake to raised position, means for remotely controlling said actuating bar including a lever, a shaft attached to and rotated by said lever, a tripping mechanism including a pair of complementary pivoted members, a forcing bar attached to said shaft for causing pivoting action between said complementary members, one of said complementary members being attached to the raising lever of said rake, said complementary members being normally in direct alignment whereby the ground engaging tines will be locked in operating position, rotation of said forcing bar by said shaft causing said complementary members to be forced out of direct alignment whereby said rake tines will be released to raised position, one of said complementary members including a pair of links receiving said other member, a tension spring attached between one of said pair of links, and the termination of said other member, a boss attached to said pair of links, a screw threadably engaged within said boss adapted to bear against the further complementary member, and whereby said screw can be turned downwardly to provide normal out of alignment position between said complementary members to provide release of said tines when striking against obstacles, a link attached between said lever and said actuating bar for operating said actuating bar.

3. In combination with a dump rake having an actuating bar for elevating the rake to raised position, means for remotely controlling said acuating bar including a lever, a shaft attached to and rotated by said lever, a tripping mechanism including a pair of complementary pivoted members, a forcing bar attached to said shaft for causing pivoting action between said complementary members, one of said complementary members being attached to the raising lever of said rake, said complementary members being normally in direct alignment whereby the ground engaging tines will be locked in operating position, rotation of said forcing bar by said shaft causing said complementary members to be forced out of direct alignment whereby said rake tines will be released to raised position, one of said complementary members including a pair of links receiving said other member, a tension spring attached between one of said pair of links, and the termination of said other member, a boss attached to said pair of links, a screw threadably engaged within said boss adapted to bear against the further complementary member, and whereby said screw can be turned downwardly to provide normal out of alignment position between said complementary members to provide release of said tines when striking against obstacles, a link attached between said lever and said actuating bar for operating said actuating bar, said link having a plurality of spaced openings whereby said link can be attached to said lever at selected points to provide adjustable angularity of said lever, a pulling cable attached to said lever, said angular adjustment providing means whereby said pulling cable will draw on said lever at a substantialy 90-degree angle therefrom regardless of the position of the terminal end of said cable.

CYRIL E. JIROVSKY.

REFERENCES CITED

The following references are of record in the file of this patent:

UNITED STATES PATENTS

| Number | Name | Date |
|---|---|---|
| 2,300,164 | Musselman | Oct. 27, 1942 |
| 2,380,190 | Rutter | July 10, 1945 |
| 2,436,245 | Bloom | Feb. 17, 1948 |
| 2,488,061 | Herman | Nov. 15, 1949 |